United States Patent
Oka et al.

(10) Patent No.: US 10,694,132 B2
(45) Date of Patent: Jun. 23, 2020

(54) SOLID-STATE IMAGING DEVICE, SIGNAL PROCESSING METHOD, AND ELECTRONIC DEVICE

(71) Applicant: SONY CORPORATION, Tokyo (JP)

(72) Inventors: Takumi Oka, Kanagawa (JP); Makoto Aoki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/087,245

(22) PCT Filed: Mar. 16, 2017

(86) PCT No.: PCT/JP2017/010577
§ 371 (c)(1),
(2) Date: Sep. 21, 2018

(87) PCT Pub. No.: WO2017/169821
PCT Pub. Date: Oct. 5, 2017

(65) Prior Publication Data
US 2019/0116329 A1     Apr. 18, 2019

(30) Foreign Application Priority Data
Mar. 30, 2016   (JP) ................................ 2016-067331

(51) Int. Cl.
*H04N 5/369*       (2011.01)
*H04N 5/355*       (2011.01)
(Continued)

(52) U.S. Cl.
CPC ........... *H04N 5/3698* (2013.01); *H04N 5/355* (2013.01); *H04N 5/3575* (2013.01); *H04N 5/378* (2013.01); *H04N 5/3745* (2013.01)

(58) Field of Classification Search
CPC .... H04N 5/3698; H04N 5/378; H04N 5/3745; H04N 5/3575; H04N 5/355; H04N 5/374; H01L 27/146
See application file for complete search history.

(56) References Cited

U.S. PATENT DOCUMENTS 8,964,086 B2    2/2015  Sakakibara et al.
2011/0242381 A1* 10/2011  Sakakibara ............ H04N 5/355
                                         348/301
(Continued)

FOREIGN PATENT DOCUMENTS

CN        102209210 A     10/2011
CN        104010145 A      8/2014
(Continued)

OTHER PUBLICATIONS

International Search Report and Written Opinion of PCT Application No. PCT/JP2017/010577, dated Jun. 13, 2017, 10 pages of ISRWO.

*Primary Examiner* — Abdelaaziz Tissire
(74) *Attorney, Agent, or Firm* — Chip Law Group (57) ABSTRACT

The present disclosure relates to a solid-state imaging device, a signal processing method, and an electronic device, capable of suppressing an input voltage of comparison apparatus at the time of P-phase input. In the present technology, a signal voltage is clipped at a predetermined voltage (for example, comparative voltage), and the clip is released at the time of D-phase count. With this configuration, the comparative voltage and the signal voltage VSL (initial voltage) do not cross (the comparator is not inverted in the D-phase). Thus, the up/down counter 32 detects this and sets the count of the P-phase to be 0 without counting the P-phase. The present disclosure can be applied to, for example, a CMOS solid-state imaging device.

5 Claims, 10 Drawing Sheets

(51) Int. Cl.
*H04N 5/357* (2011.01)
*H04N 5/3745* (2011.01)
*H04N 5/378* (2011.01)

(56) References Cited

U.S. PATENT DOCUMENTS

| | | | |
|---|---|---|---|
| 2014/0240568 A1* | 8/2014 | Yamagata | H04N 5/378 348/308 |
| 2014/0291482 A1* | 10/2014 | Tanaka | H04N 5/378 250/208.1 |
| 2014/0293104 A1* | 10/2014 | Tanaka | H04N 5/3745 348/301 |
| 2015/0138414 A1 | 5/2015 | Sakakibara et al. | |
| 2015/0237278 A1* | 8/2015 | Sakakibara | H04N 5/355 348/301 |
| 2016/0065871 A1 | 3/2016 | Sakakibara et al. | |
| 2016/0094794 A1 | 3/2016 | Sakakibara et al. | |
| 2017/0339356 A1* | 11/2017 | Hwang | H04N 5/3698 |

FOREIGN PATENT DOCUMENTS

| | | |
|---|---|---|
| JP | 2011-229120 A | 11/2011 |
| JP | 2014-165845 A | 9/2014 |
| KR | 10-2011-0109891 A | 10/2011 |
| KR | 10-2016-0110322 A | 9/2016 |
| KR | 10-2016-0138933 A | 12/2016 |
| TW | 201143417 A | 12/2011 |
| TW | 201601540 A | 1/2016 |

* cited by examiner

SOLID-STATE IMAGING DEVICE, SIGNAL PROCESSING METHOD, AND ELECTRONIC DEVICE

CROSS REFERENCE TO RELATED APPLICATIONS

This application is a U.S. National Phase of International Patent Application No. PCT/JP2017/010577 filed on Mar. 16, 2017, which claims priority benefit of Japanese Patent Application No. JP 2016-067331 filed in the Japan Patent Office on Mar. 30, 2016. Each of the above-referenced applications is hereby incorporated herein by reference in its entirety.

TECHNICAL FIELD

The present disclosure relates to a solid-state imaging device, a signal processing method, and an electronic device, and in particular, to a solid-state imaging device, a signal processing method, and an electronic device, capable of suppressing an input voltage of comparison apparatus at the time of P-phase input.

BACKGROUND ART

Patent Document 1 proposes D-phase prefetch operation (hereinafter referred to as DDS drive) for reading a charge of a photodiode first.

CITATION LIST

Patent Document

Patent Document 1: Japanese Patent Application Laid-Open No. 2011-229120

SUMMARY OF THE INVENTION

Problems to be Solved by the Invention

Since a level of a signal line at the time of initial voltage set (Auto zero) and a level of the signal line at the time of D-phase are the same in the DDS drive, an input voltage of comparison apparatus at the time of P-phase input may be larger than a power supply voltage at the time of large light amount.

The present disclosure is made in view of such a situation, and can suppress the input voltage of the comparison apparatus at the time of P-phase input.

Solutions to Problems

A solid-state imaging device according to one aspect of the present technology includes: a pixel array unit in which unit pixels each having a photoelectric conversion unit is arranged; a drive unit that drives reading a signal charge of the unit pixels as a first signal being a signal level and a second signal being a reset level read after the first signal; and a clip circuit that clips the signal level to a predetermined level that is higher level than a signal voltage, at the time of initial voltage set in the driving, and releases the signal level clipped to the predetermined level in reading of the first signal.

The solid-state imaging device further includes a counter that counts in each period from a start to an end of each reading operation of the first signal and the second signal, and the counter can set count to 0 in reading of the second signal.

The counter can count D-phase in reading of the first signal and can count P-phase in reading of the second signal.

A signal processing method according to one aspect of the present technology is a signal processing method in signal processing of a solid-state imaging device including a pixel array unit in which unit pixels each having a photoelectric conversion unit is arranged, and a drive unit that drives reading a signal charge of the unit pixels as a first signal being a signal level and a second signal being a reset level read after the first signal, the method including clipping a signal level to a predetermined level that is higher level than a signal voltage, in initial voltage set in the driving; and releasing the signal level clipped to the predetermined level in reading of the first signal.

An electronic device according to one aspect of the present technology has: a solid-state imaging device including a pixel array unit in which unit pixels each having a photoelectric conversion unit is arranged; a drive unit that drives reading a signal charge of the unit pixels as a first signal being a signal level and a second signal being a reset level read after the first signal; and a clip circuit that clips the signal level to a predetermined level that is higher level than a signal voltage in initial voltage set in the driving, and releases the signal level clipped to the predetermined level in reading of the first signal; a signal processing circuit that processes an output signal output from the solid-state imaging device; and an optical system that causes an incident light to be incident on the solid-state imaging device.

In one aspect of the present technology, in initial voltage set in driving of reading a signal charge of unit pixels as a first signal being a signal level and a second signal being a reset level read after the first signal, the signal level is clipped to a predetermined level that is higher level than a signal voltage, and the signal level clipped to the predetermined level in reading of the first signal is released.

Effects of the Invention

According to the present technology, an input voltage of comparison apparatus at the time of P-phase input can be suppressed.

Note that the effects described herein are merely illustrative, effects of the present technology is not limited to the effects described herein, and the present technology may have additional effects.

MODE FOR CARRYING OUT THE INVENTION

Hereinafter, a mode for implementing the present disclosure (hereinafter referred to as an embodiment) will be described. Note that the description will be made in the following order.

1. First Embodiment (Example of Solid-State Imaging Device)
2. Second Embodiment (Use Example of Image Sensor)
3. Third Embodiment (Example of Electronic Device)

1. First Embodiment (Example of Solid-State Imaging Device)

<Schematic Configuration Example of Solid-State Imaging Device>

Figure 1:
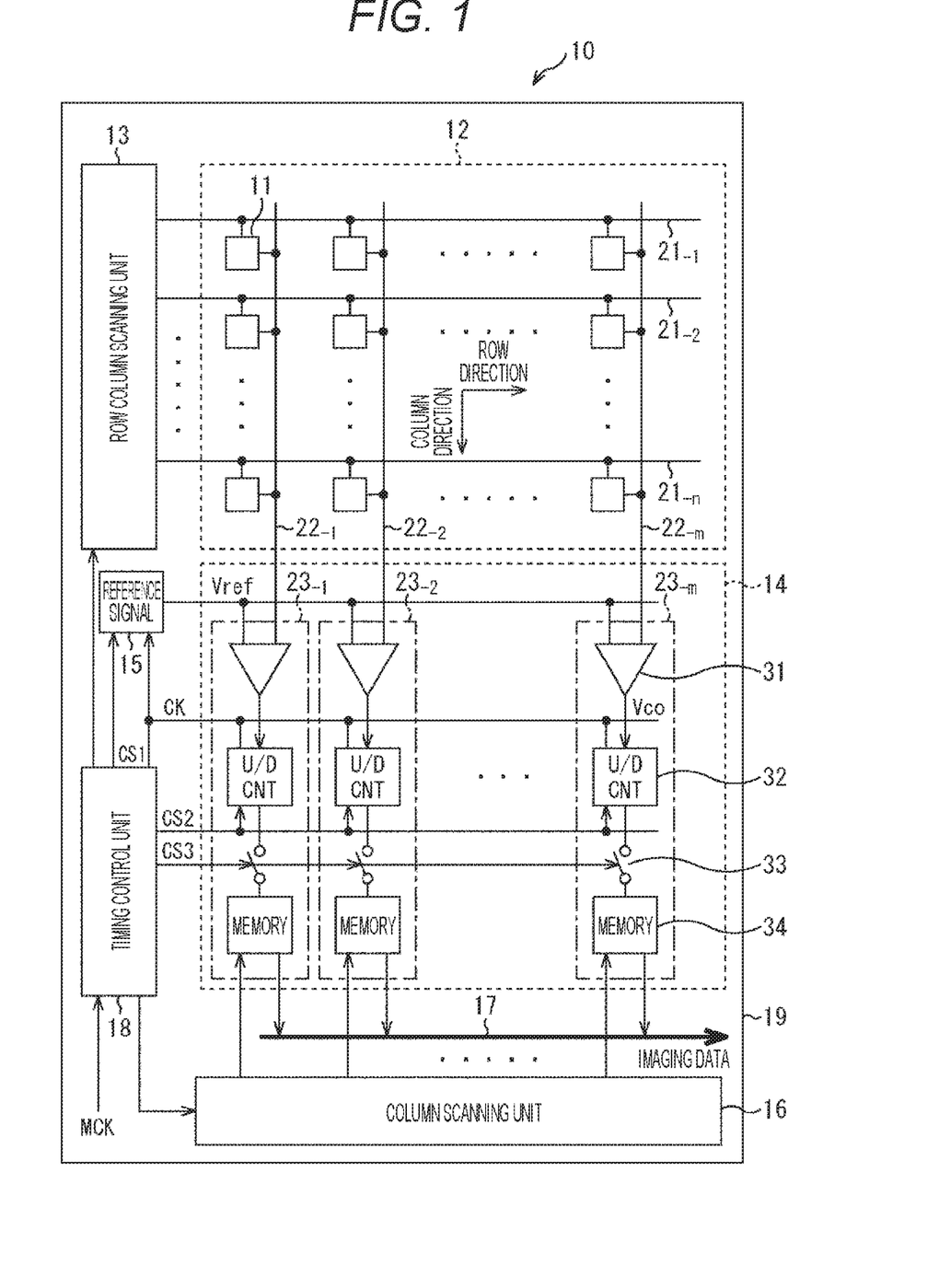
FIG. 1 is a block diagram illustrating a schematic configuration example of a solid-state imaging device to which the present technology is applied.

FIG. 1 illustrates a schematic configuration example of an example of a complementary metal oxide semiconductor (CMOS) solid-state imaging device applied to each embodiment of the present technology. Here, the CMOS image solid-state imaging device is a solid-state imaging device made by applying, alternatively, partly using a CMOS process.

As illustrated in FIG. 1, a solid-state imaging device (element chip) 10 has: a pixel array unit 12 in which unit pixels 11 are two-dimensionally arranged in a matrix form; and a peripheral drive system that drives each of the unit pixels 11 of the pixel array unit 12 and a signal processing system. In the solid-state imaging device 10 illustrated in FIG. 1, as the peripheral drive system and the signal processing system, for example, a row scanning unit 13, a column processing unit 14, a reference signal generation unit 15, a column scanning unit 16, a horizontal output line 17, and a timing control unit 18 are provided. These drive system and signal processing system are integrated on a semiconductor substrate (chip) 19 that is the same as the pixel array unit 12.

In this configuration, the timing control unit 18 generates a clock signal, a control signal, and the like on the basis of a master clock MCK, the signals being references of the operation of the row scanning unit 13, the column processing unit 14, the reference signal generation unit 15, the column scanning unit 16, and the like. The clock signal, the control signal, and the like generated by the timing control unit 18 are also given to the row scanning unit 13, the column processing unit 14, the reference signal generation unit 15, the column scanning unit 16, and the like as drive signals of the units.

The unit pixel 11 has a photoelectric conversion element (for example, photo diode (PD)), a plurality of pixel transistors (Tr, so-called MOS transistors), and a charge detection unit (also called floating diffusion: FD). The plurality of pixel transistors can include three transistors of, for example, a transfer transistor, a reset transistor, and an amplification transistor, and can also include four transistors by further including a selection transistor.

Furthermore, the unit pixel 11 can be a pixel sharing structure. The pixel sharing structure includes a plurality of PDs, a plurality of transfer transistors, one shared FD, and each one of other shared pixel transistors.

In the pixel array unit 12, the unit pixels (hereinafter, also simply referred to as a pixels) 11 each having a photoelectric conversion unit that generates and accumulates a photocharge corresponding to the amount of received light are two-dimensional arrayed in a row direction and a column direction, in other words, in a matrix shape. Here, the row direction refers to an array direction of the pixels in a pixel row (in other words, horizontal direction/transverse direction), and the column direction refers to an array direction of the pixels of a pixel column (in other words, vertical direction/longitudinal direction).

In this pixel array unit 12, row control lines 21 ($21_{-1}$ to $21_{-n}$) are wired along the row direction for each pixel matrix, and column signal lines 22 ($22_{-1}$ to $22_{-m}$) are wired along the column direction, with respect to the pixel arrangement in the matrix form. The row control line 21 transmits a control signal for controlling of when reading from the unit pixel 11. In the example of FIG. 1, the row control line 21 is shown as one wiring. However, the row control line 21 is not limited to one. Each end of the row control line is connected to each output terminal corresponding to each row of the row scanning unit 13.

The row scanning unit 13 includes a shift register, an address decoder, and the like, and drives each pixel 11 of the pixel array unit 12 at the same time for all pixels, in units of rows, or the like. In other words, the row scanning unit 13 includes a drive unit that drives each pixel 11 of the pixel array unit 12 together with the timing control unit 18 that controls the row scanning unit 13. Although the specific configuration of the row scanning unit 13 is not illustrated, in general, the row scanning unit 13 has two scanning systems of a reading scanning system and a sweeping scanning system.

In order to read a signal from the unit pixel 11, the reading scanning system sequentially selects and scans the unit pixels 11 of the pixel array unit 12 in units of rows. The signal read from the unit pixel 11 is an analog signal. In the sweeping scanning system, sweeping scan is performed ahead of reading scan by amount of time of shutter speed, with respect to a reading row where reading scan is performed by the reading scanning system.

Unnecessary charges are swept out from the photoelectric conversion unit of the unit pixel 11 in the reading row by the sweeping scan by the sweeping scanning system, whereby the photoelectric conversion unit is reset. Then, so-called electronic shutter operation is performed by sweeping out (resetting) unnecessary charges by this sweeping scanning system. Here, the electronic shutter operation refers to operation of discarding a photocharge of the photoelectric conversion unit and starting new exposure (starting accumulation of a photocharge).

The signal read by the reading operation by the reading scanning system corresponds to the amount of light received after the immediately preceding reading operation or electronic shutter operation. Then, the period from a reading timing by the immediately preceding reading operation or a sweeping timing by the electronic shutter operation, to a reading timing by the present reading operation is an exposure period of the photocharge in the unit pixel 11.

The column processing unit 14 has an analog-digital (AD) conversion circuits 23 ($23_{-1}$ to $23_{-m}$) provided, for example, for each pixel column of the pixel array unit 12, in other words, in one-to-one correspondence for each of the column signal lines 22 ($22_{-1}$ to $22_{-m}$). The AD conversion circuits 23 ($23_{-1}$ to $23_{-m}$) convert an analog signal (pixel signal) output for each pixel column from each unit pixel 11 of the pixel array unit 12, to a digital signal.

The reference signal generation unit 15 generates a reference signal Vref of a so-called ramp waveform (gradient waveform) in which a voltage value changes stepwise as time elapses. The reference signal generation unit 15 can be configured using, for example, a digital-analog conversion (DAC) circuit. Note that the reference signal generation unit 15 is not limited to the one having a configuration using the DAC circuit.

Under the control of a control signal CS1 given from the timing control unit 18, the reference signal generation unit 15 generates the reference signal Vref of the ramp wave on the basis of a clock CK given from the timing control unit 18. Then, the reference signal generation unit 15 supplies the generated reference signal Vref to the AD conversion circuits $23_{-1}$ to $23_{-m}$ of the column processing unit 14.

All the AD conversion circuits $23_{-1}$ to $23_{-m}$ has the same configuration. Here, it is assumed that the AD conversion circuit 23, in the m-th column is taken as an example. The AD conversion circuit 23, includes: comparison apparatus 31; a counting unit, for example, an up/down counter (described as "U/DCNT" in the drawing) 32; a transfer switch 33; and a memory device 34.

The comparison apparatus 31 sets a signal voltage VSL of the column signal line 22-*m* corresponding to the pixel signal output from each unit pixel 11 in the n-th column of the pixel array unit 12 to be a comparison input, and the reference signal Vref of the ramp wave supplied from the reference signal generation unit 15 to be a reference input, and compares both of the comparison input and the reference input. Then, in the comparison apparatus 31, for example, an output Vco is set to a first state (for example, high level) when the reference signal Vref is greater than the signal voltage VSL, and the output Vco is set to a second state (for example, low level) when the reference signal Vref is equal to or less than the signal voltage VSL.

The up/down counter 32 is an asynchronous counter. Under the control of a control signal CS2 given from the timing control unit 18, the clock CK is given from the timing control unit 18 to the up/down counter 32 at the same timing as the reference signal generation unit 15. Then, the up/down counter 32 performs down counting or up counting in synchronization with the clock CK to measure a comparison period from the start of the comparison operation by the comparison apparatus 31 to the end of the comparison operation.

The transfer switch 33 is turned on (off) at the point of time when the count operation of the up/down counter 32 for the unit pixel 11 of a certain pixel row is completed under the control of a control signal CS3 given from the timing control unit 18. Then, the transfer switch 33 transfers a count result of the up/down counter 32 to the memory device 34.

In this manner, for the analog signals supplied from each unit pixel 11 of the pixel array unit 12 via the column signal lines 22-1 to 22, for each pixel row, first, the comparison apparatus 31 performs the comparison operation in the AD conversion circuits 23 ($23_{-1}$ to $23_{-m}$). Then, in the up/down counter 32, the count operation is performed over the period from the start of the comparison operation in the comparison apparatus 31 to the end of the comparison operation, whereby the analog signal is converted into a digital signal and stored in the memory device 34.

The column scanning unit 16 includes a shift register, an address decoder, and the like, and controls column addresses and column scanning of the AD conversion circuits $23_{-1}$ to $23_{-m}$ in the column processing unit 14. Under the control of the column scanning unit 16, the digital signal that has been AD-converted by each of the AD conversion circuits $23_{-1}$ to $23_{-m}$ is sequentially read to the horizontal output line 17, and is output via the horizontal output line 17, as imaging data.

Note that, although not being particularly illustrated since not being directly related to the present disclosure, a circuit or the like that applies various signal processing on imaging data output via the horizontal output line 17 can be provided in addition to the above components. At that time, whether or not these circuits are provided on the same semiconductor substrate 19 as the pixel array unit 12 is irrelevant.

The solid-state imaging device 10 with a column parallel ADC configured as described above can also perform global exposure in which exposure start and exposure end are performed at the same timing for all the pixels 11 in the pixel array unit 12. This global exposure is performed under the driving by the drive unit including the row scanning unit 13 and the timing control unit 18. A global shutter function for realizing the global exposure is shutter operation suitable for use in sensing applications that require imaging of high speed moving subjects and simultaneous imaging of images.

Note that, in the example of FIG. 1, the configuration of the column processing unit 14 in which the AD conversion circuit 23 is provided in one-to-one correspondence for each column signal line 22 has been described as an example. However, the arrangement is not limited to the one-to-one correspondence. For example, it is possible to adopt a configuration in which one AD conversion circuit 23 is shared among a plurality of pixel columns and used in time division among the plurality of pixel columns.

<Configuration Example of Comparison Apparatus>

Figure 2A:
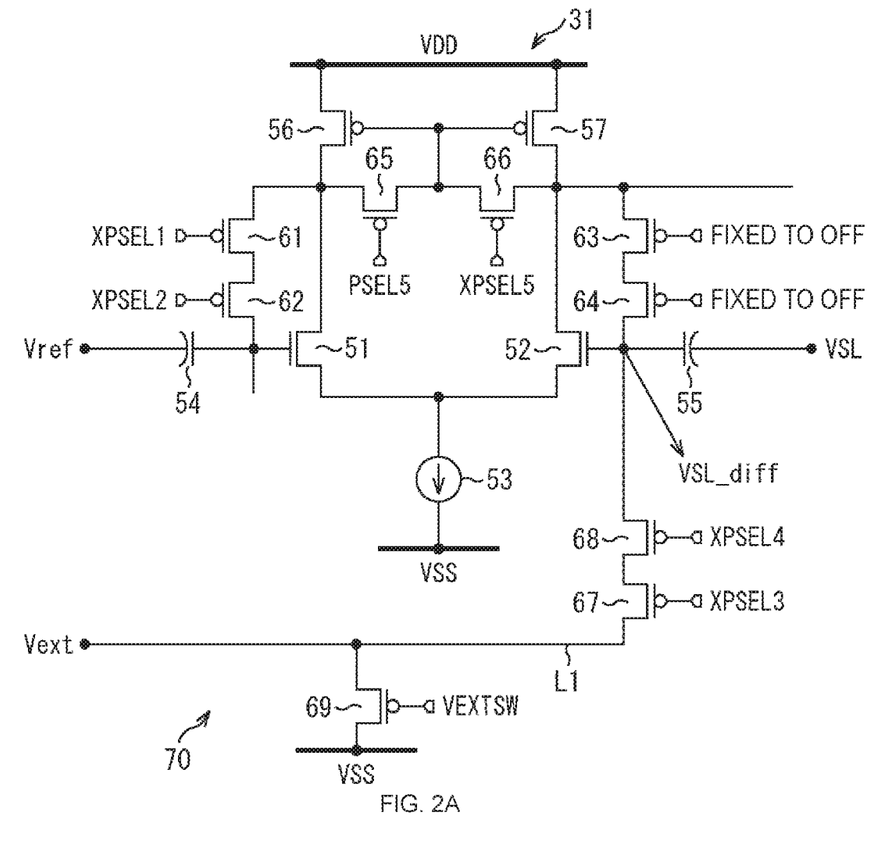
FIGS. 2A and 2B are diagrams for explaining comparison apparatus to which the present technology is applied.
Figure 2B:
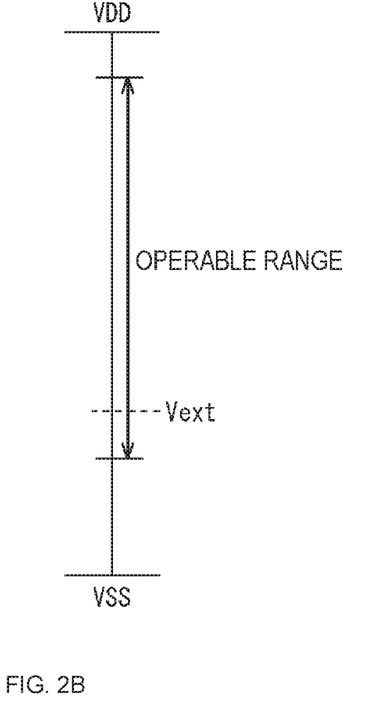

FIGS. 2A and 2B are diagrams illustrating comparison apparatus to which the present technology is applied. FIG. 2A is a diagram illustrating a configuration example of the comparison apparatus, and FIG. 2B is a diagram illustrating an operation range of the comparison apparatus.

In the example of FIG. 2A, the comparison apparatus 31 includes NMOS transistors 51, 52, PMOS transistors 56, 57, 61 to 69, a current source 53, capacitors 54, 55, and an initial voltage set circuit 70 for setting (adjusting) a reference voltage of the inside the AD conversion circuit 23.

The NMOS transistors 51, 52 are differential pair transistors whose source electrodes are connected in common. The current source 53 is connected between a source common node of the NMOS transistors 51, 52 that are differential pair transistors, and the ground.

The reference signal Vref of an inclined waveform (staircase wave: ramp wave) generated by the reference signal generation unit 15 is given to a gate electrode of the NMOS transistor 51 via the capacitor 54. The signal voltage VSL supplied from the unit pixel 11 through the column signal line 22, is given via the capacitor 55 to the gate electrode of the NMOS transistor 52.

A diode connection configuration, in other words, the PMOS transistor 56 connected with the gate electrode and a drain electrode in common, is connected between the drain electrode of the NMOS transistor 51 and a power supply VDD. The PMOS transistor 57 is connected between the drain electrode of the NMOS transistor 52 and the power supply VDD. The gate electrodes of PMOS transistors 56, 57 are connected in common.

PMOS transistors 61, 62 are connected between the gate electrode and the drain electrode of the NMOS transistor 51. PMOS transistors 63, 64 are connected between the gate electrode and the drain electrode of the NMOS transistor 52. Furthermore, PMOS transistors 65, 66 are connected between the drain electrode of the NMOS transistor 51 and the drain electrode of the NMOS transistor 52. The drain electrodes of the PMOS transistors 65, 66 are connected in common and, are connected to the gate electrodes of the PMOS transistors 56, 57.

Inverted signals of control signals XPSEL1, XPSEL2 are given to the gate electrodes of the PMOS transistors 61, 62, respectively. Note that the PMOS transistors 63, 64 are fixed to OFF since they are not directly related to double data sampling (DDS) drive of the present technology, but are used after switching to correlated double sampling (CDS) drive in this comparison apparatus 31. Note that the DDS drive and the CDS driving will be described later. An inverted signal of a control signal PEL5 and an inverted signal of a control signal XPSEL5 are given to the gate electrodes of the PMOS transistors 65, 66, respectively.

The initial voltage set circuit 70 includes: PMOS transistors 67, 68 connected between a line L1 to which an external applied initial voltage Vext set externally is given and the gate electrode of the NMOS transistor 52; and a PMOS transistor 69 connected between the line L1 and a VSS. An inverted signal of a control signal XPSEL4 and an inverted signal of a control signal XPSEL3 are given to the gate electrodes of the PMOS transistors 67, 68, respectively. The VSS is connected to the source electrode of the PMOS transistor 69. An inverted signal of a control signal VEXTSW is given to the gate electrode of the PMOS transistor 69. The PMOS transistor 69 is for suppressing an initial voltage.

These control signals are given from, for example, the timing control unit 18 illustrated in FIG. 1.

Note that that the PMOS transistor 62 is provided so as to perform the similar operation as the PMOS transistor 61 in order to alleviate the effect of the rise of the PMOS transistor 61, and may be eliminated. Similarly, the PMOS transistor 64 is provided so as to perform the similar operation as the PMOS transistor 63 in order to alleviate the effect of the rise of the PMOS transistor 63, the PMOS transistor 68 is provided so as to perform the similar operation as the PMOS transistor 67 in order to alleviate the effect of the rise of the PMOS transistor 67, and the PMOS transistor 64 and the PMOS transistor 68 may be eliminated. Therefore, description will be made below with the operation of the PMOS transistors 62, 64, 68 omitted.

<Driving Example of DDS>

Figure 3:
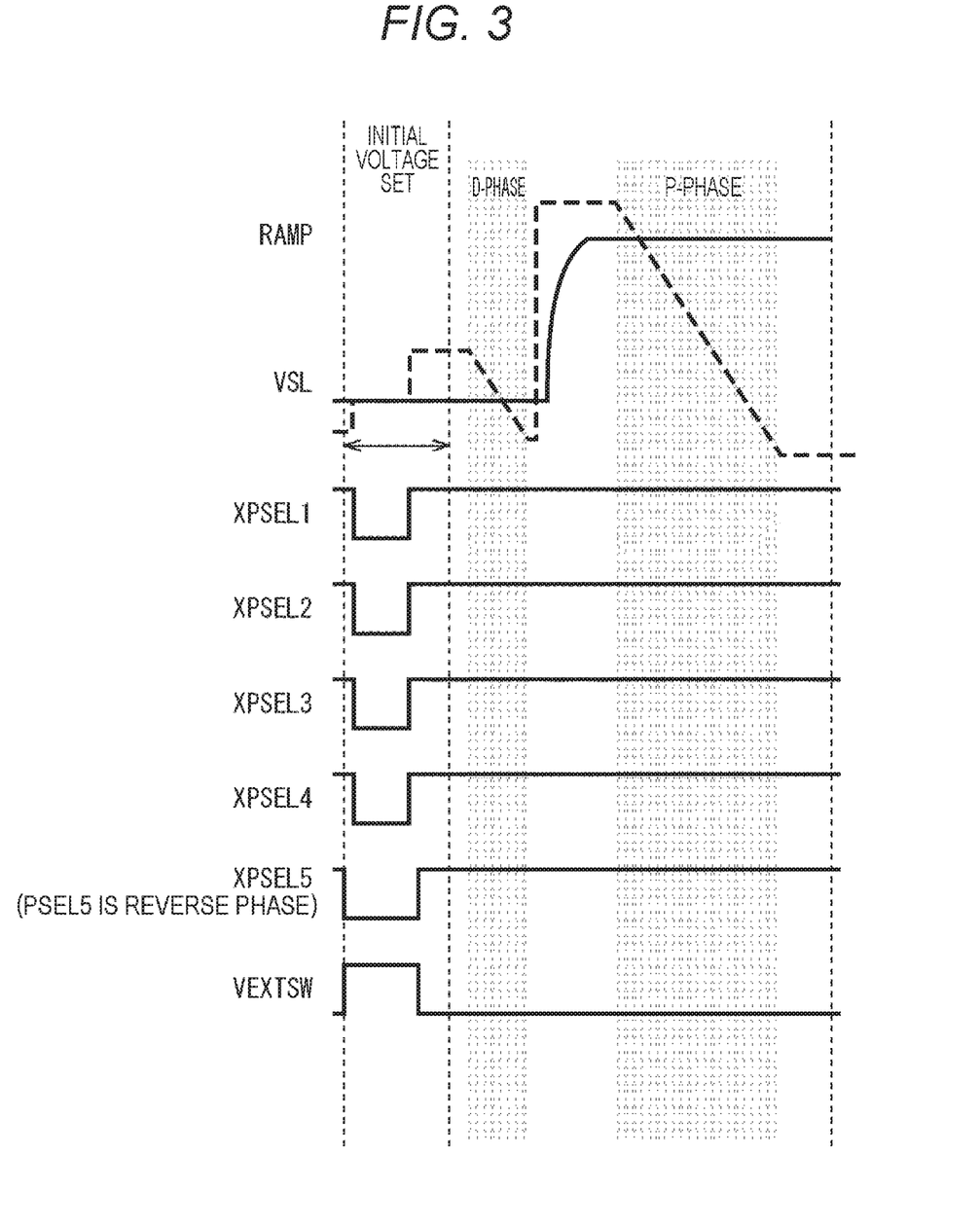
FIG. 3 is a diagram illustrating an example of a timing chart at the time of DDS drive.

In the example of FIG. 3, an example of a timing chart of the DDS drive is illustrated. At the initial voltage determination (auto zero), the control signal XPSEL1 (XPSEL2 is similar to XPSEL1), the control signal XPSEL3 (XPSEL4 is similar to XPSEL3), and the control signal XPSEL5 are applied. In response to the control signal XPSEL1, the control signal XPSEL3, and the control signal XPSEL5, the PMOS transistor 61, the PMOS transistor 67, and the PMOS transistor 66 are rendered conductive, and the initial voltage determination (auto zero) starts in the AD conversion circuit 23. When the control signal XPSEL1, the control signal XPSEL3, and the control signal XPSEL5 are turned off, the PMOS transistor 61, the PMOS transistor 67, and the PMOS transistor 66 are rendered non-conductive, and the initial voltage determination (auto zero) ends in the AD conversion circuit 23.

In this way, in the comparison apparatus 31, the PMOS transistor 67 is rendered conductive in response to the control signal XPSEL3 during the DDS drive, so that the external applied initial voltage Vext is given to the gate electrode of the NMOS transistor 52. As illustrated in FIG. 2B, the initial voltage is adjusted by this external applied initial voltage Vext to be within the operable range of the comparison apparatus 31. Accordingly, the reference voltage of the inside of the AD conversion circuit 23 is adjusted so that the operation range of the comparison apparatus 31 falls within the range of the slope of the reference signal Vref of the inclined waveform, and the comparison apparatus 31 can operate within the slope.

<Example of Pixel Operation at Driving DDS>

Next, the pixel operation during the DDS drive will be described with reference to FIG. 4. In the solid-state imaging device 10, the signal charge held or stored in the FD is read as a signal level (first signal), then the FD is reset to a predetermined potential, and the predetermined potential is read as a reset level (second signal). This driving is called "DDS drive". In this DDS drive, the signal level read from the unit pixel 11 first is used as a reference voltage that is to be a reference of a convertible input voltage range of the AD conversion circuit 23. Note that the "CDS driving" is driving in which the FD is reset to a predetermined potential, the predetermined potential is read as a reset potential, then the signal charge accumulated in the PD is transferred to the FD, and the signal charge of the FD is read as a signal level.

Figure 4:
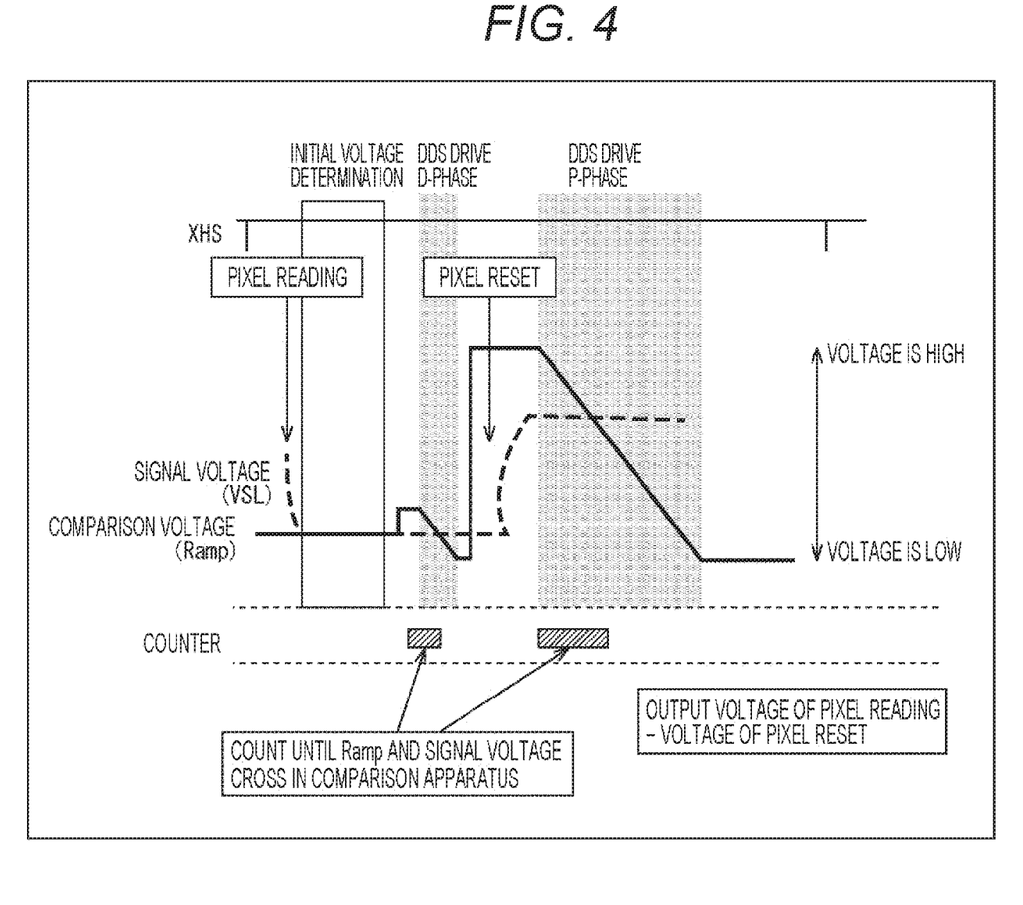
FIG. 4 is a diagram for explaining pixel operation at the time of DDS drive.

In the example of FIG. 4, the pixel operation (initial voltage determination, D-phase count, P-phase count), at the time of DDS drive, the waveform of the comparative voltage (Ramp) (dashed line) and the signal voltage VSL (solid line), and operation time of the counter are illustrated. Note that in FIG. 4 and in the following examples, a low voltage indicates darkness and a high voltage indicates brightness.

When pixel reading starts, the signal voltage (VSL) falls further in a bright environment. Thus, for example, a voltage is decreased to the comparative voltage, and the voltage that has decreased is the initial voltage, and this is a reference of the initial voltage and the D-phase by the time of pixel reset. Thereafter, the up/down counter 32 starts counting of the D-phase and counts the D-phase until the comparative voltage (Ramp) crosses with the signal voltage VSL (initial voltage).

The pixel reset is performed after counting of the D-phase, and in the subsequent P-phase, the signal voltage ((reset level)−(initial voltage)) of when the pixel is reset is used as a reference. The up/down counter 32 starts counting of the P-phase and counts until the comparative voltage (Ramp) crosses with the signal voltage VSL (at the time of reset). Then, the signal voltage at the time of signal voltage of the pixel reading—the signal voltage at the time of reset is output from the comparison apparatus 31.

<Examples of Sunspot>

Figure 5:
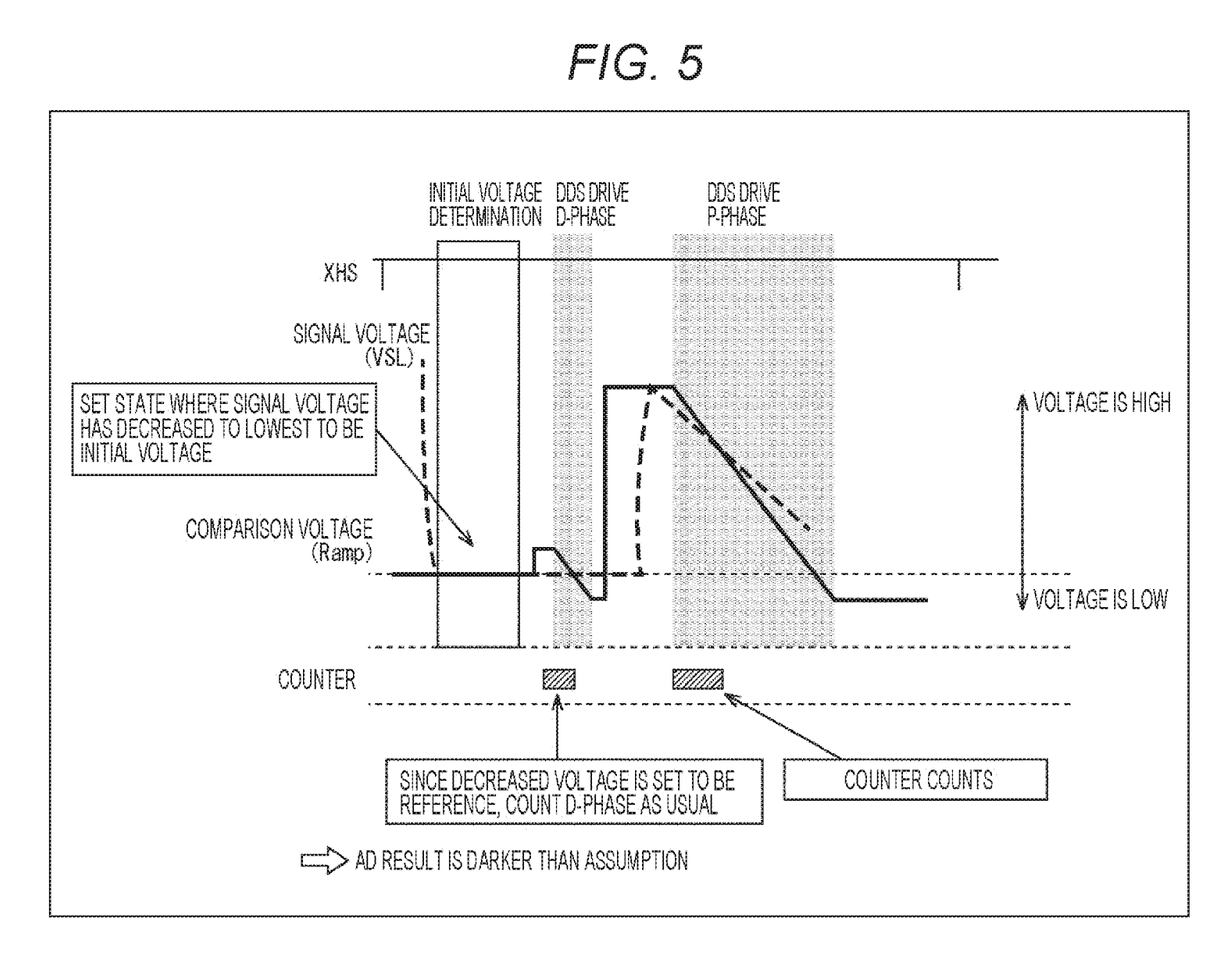
FIG. 5 is a diagram for explaining a sunspot.

Next, the sunspot will be described with reference to FIG. 5.

In a bright environment, the signal voltage at the time of initial voltage determination falls further, so the initial voltage that has decreased to the lowest is set to a reference for the initial voltage and the D-phase. The up/down counter 32 starts counting of the D-phase and counts the D-phase until the comparative voltage (Ramp) crosses with the signal voltage VSL (initial voltage).

The pixel reset is performed after counting of the D-phase, and in the P-phase, the signal voltage ((reset level)−(initial voltage)) of when the pixel is reset is used as a reference, and the up/down counter 32 starts counting the P-phase. However, the signal level is decreased in a bright environment even after the pixel reset, so the AD result will be darker than assumption though the result should be bright.

Therefore, in the present technology, the signal voltage is clipped at the time of the initial voltage determination and the clip is removed at the time of D-phase counting.

<Example of Sunspot Correction Function>

Figure 6:
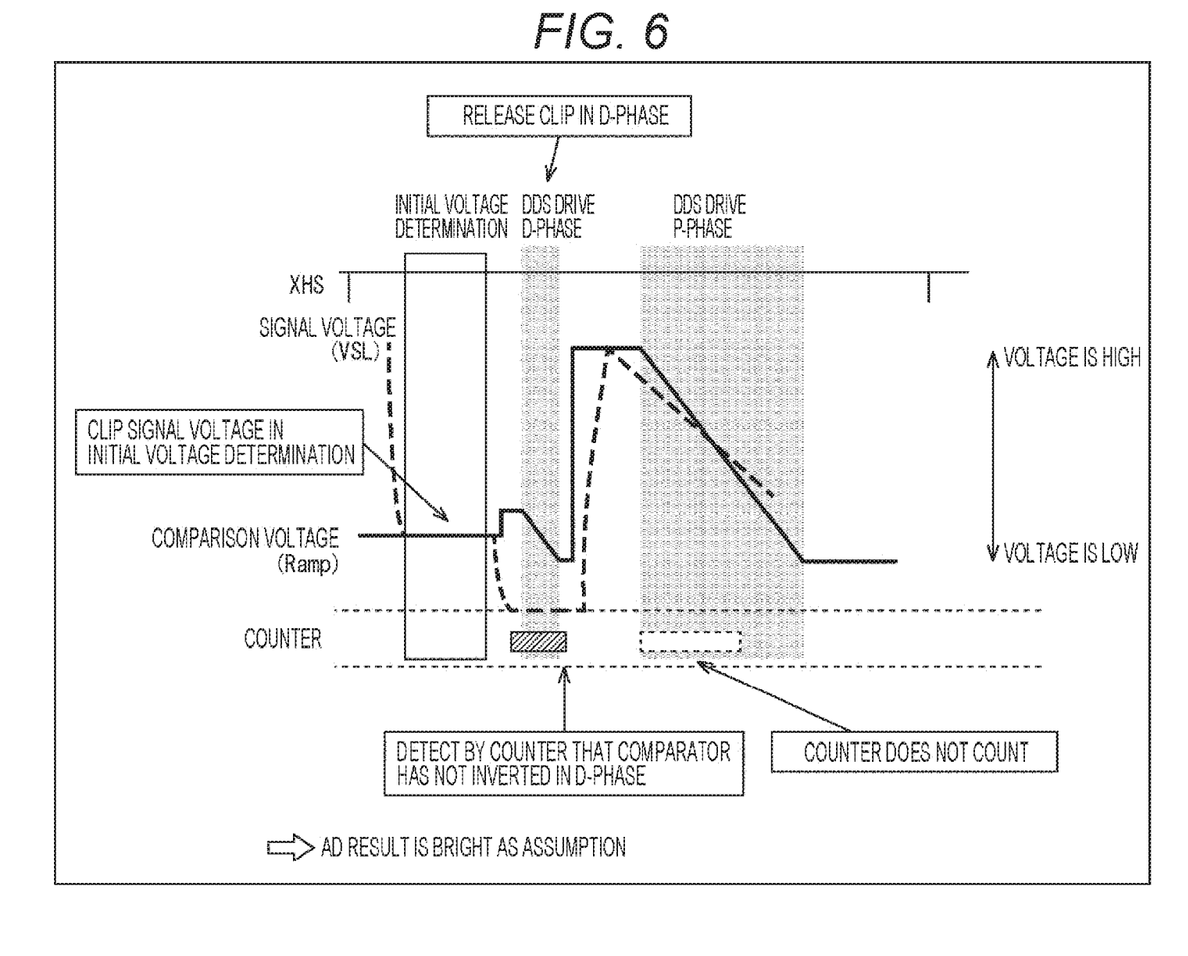
FIG. 6 is a diagram for explaining a sunspot correction function in the present technology.

In the example of FIG. 6, a sunspot correction function in the present technology is illustrated.

In the present technology, the signal voltage is clipped at a predetermined voltage (for example, comparative voltage), releases the clip at the time of the D-phase count.

With this configuration, the comparative voltage and the signal voltage VSL (initial voltage) do not cross (the comparator is not inverted in the D-phase). Thus, the up/down counter 32 detects this and sets the count of the P-phase to be 0 without counting the P-phase. Although the signal level decreases even in the bright environment even after the pixel reset, when the count of the P-phase is set to 0, the AD result can be brighter than the assumption.

Figure 7:
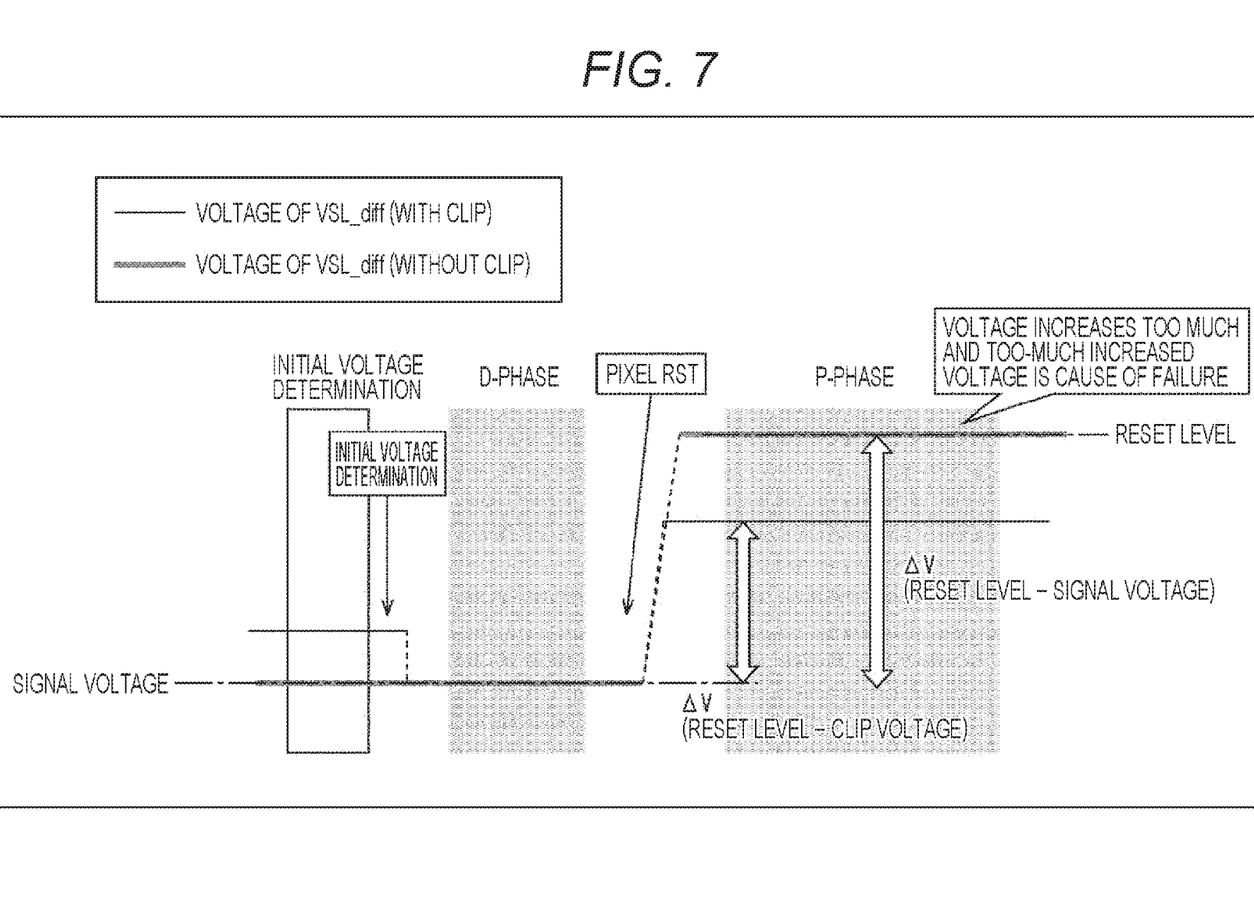
FIG. 7 is a diagram illustrating an example of effects by the present technology.

Furthermore, as indicated by the thick line in FIG. 7, the level (signal level) of the signal line at the time of initial voltage determination and the level (signal level) of the signal line at the time of the D-phase are substantially the same at the time of DDS drive. Thus, the reset level due to the pixel reset becomes large, and as a result, there is a possibility that the input voltage of the comparison apparatus 31 at the time of P-phase input becomes larger than the power supply voltage at large light amount.

Therefore, as described above, when the value of VSL_diff that is the signal voltage illustrated in FIGS. 2A and 2B is clipped at a predetermined voltage, as illustrated in FIG. 7, the initial voltage is determined by the clipped value. Thereafter, the clip is configured to be canceled at the time of D-phase count.

With this configuration, as indicated by the thick line in FIG. 7, a value ΔV of VSL_diff at the time of P-phase input in which (reset level)−(signal voltage) becomes (reset level)−(clip voltage) as indicated by the solid line in FIG. 7, and the reset level due to the pixel reset is prevented from increasing. As a result, it is possible to prevent the input voltage of the comparison apparatus 31 at the time of the P-phase input from increasing to be larger than the power supply voltage at the time of large light amount.

<Configuration Example of Clip Circuit>

Figure 8:
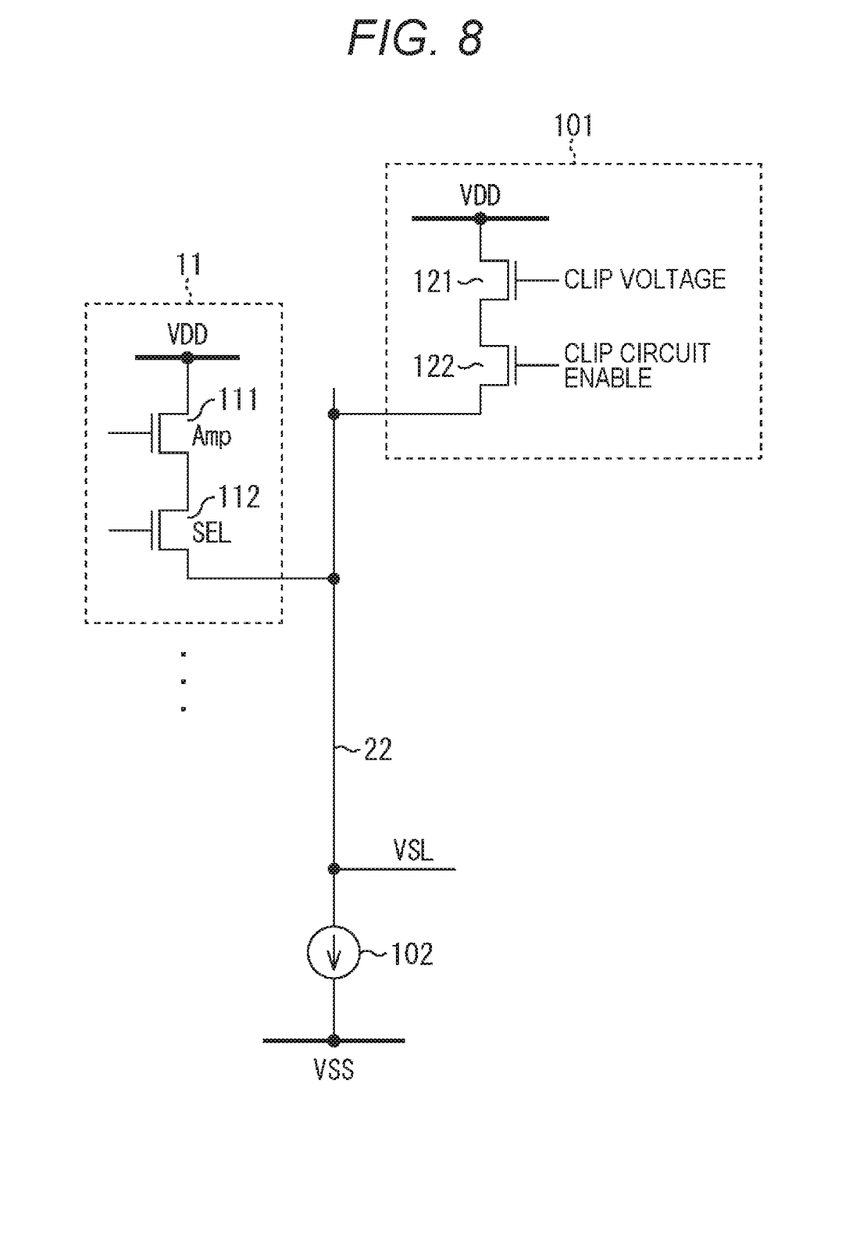
FIG. 8 is a diagram illustrating a configuration example of a clip circuit.

The clip processing described above is performed by the clip circuit illustrated in FIG. 8. A clip circuit 101 of the present technology is provided in the column signal line 22 as a dummy pixel of the unit pixel 11 including, for example, at least an amplifier Tr 111 and selection Tr 112. A constant current source 102 is connected to one end of the column signal line 22. Although not shown in the drawing, in actuality, the unit pixel 11 further includes a PD, a transfer Tr, an FD, a capacity, a reset Tr, and the like so as to be connected to the gate electrode of the amplifier Tr111.

The clip circuit 101 includes, for example, a Tr121 to which a clip voltage is input from the gate electrode, and a Tr122 to which an enable signal of the clip circuit 101 is input to the gate electrode. When the enable signal is input to the gate electrode of the Tr122 and the Tr122 is turned on, the Tr121 clips the signal voltage VSL of the column signal line 22 so that the column signal does not fall below the clip voltage input from the gate electrode.

As described above, in the present technology, the value of the signal voltage is clipped to a predetermined voltage before the voltage reaches the lowest, at the time of determination of the initial voltage at the time of large light amount, and the clip is released at the time of the D-phase count.

With this configuration, the input voltage of the comparison apparatus 31 at the time of the P-phase input can be prevented from being larger than the power supply voltage at the time of large light amount.

Moreover, in the present technology, the count of the P phase is set to 0. With this configuration, since the count value of the P-phase can be reduced, the image can be made white. In other words, according to the present technology, the sunspot correction at the time of the DDS drive can be performed.

2. Second Embodiment (Use Example of Image Sensor)

Figure 9:
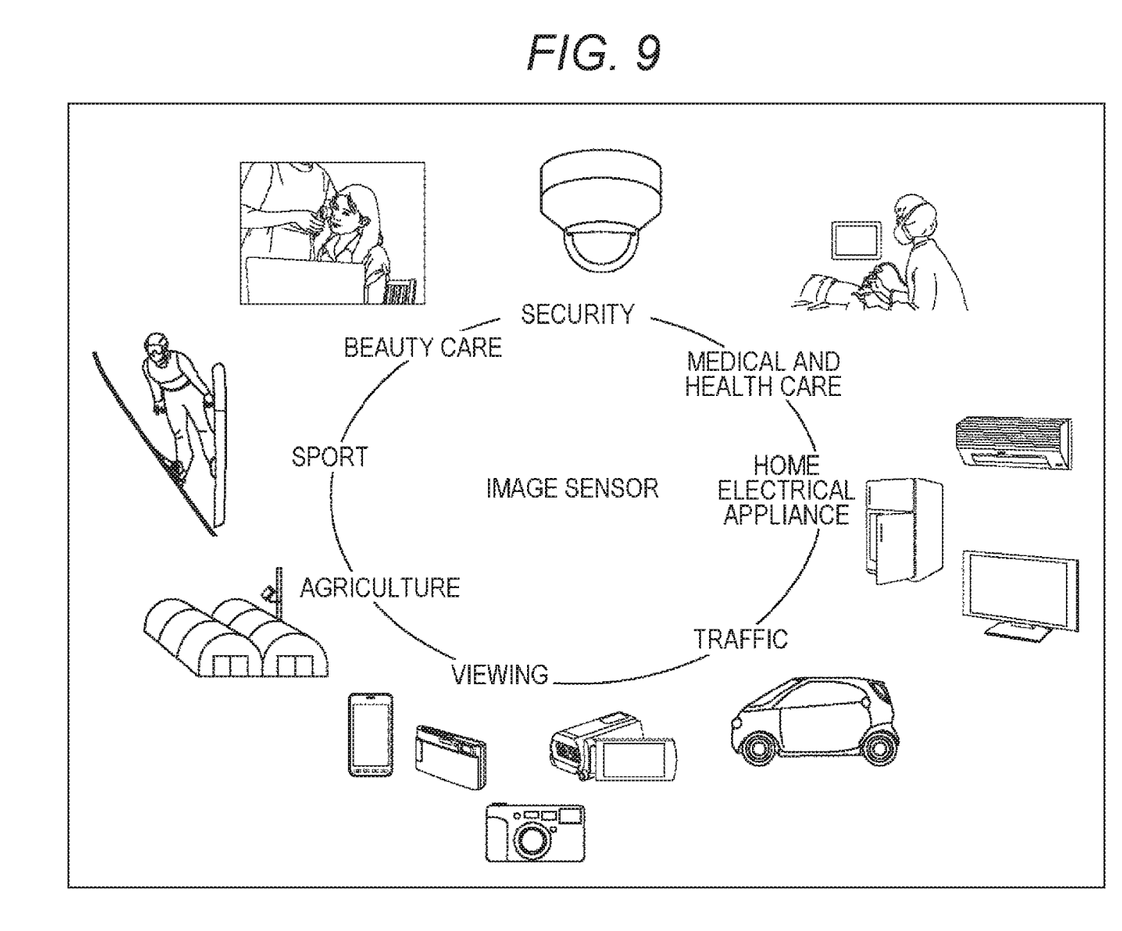
FIG. 9 is a diagram illustrating an example of use of an image sensor.

FIG. 9 is a diagram illustrating a use example using the solid-state imaging device described above.

The above-described solid-state imaging device (image sensor) can be used in various cases, for example, for sensing light such as visible light, infrared light, ultraviolet light, and X-rays, as described below.

- A device for photographing an image to be used for viewing, such as a digital camera, a portable device with a camera function
- A device used for traffic purpose such as: an in-vehicle sensor for photographing the front, rear, surroundings, inside of a car, or the like of an automobile for safe driving such as automatic stop and recognition of driver's condition or the like; a surveillance camera for monitoring traveling vehicles and roads; and a distance measuring sensor that measures the distance between vehicles or the like;
- A device used for a home electrical appliance such as TV, refrigerator, and air conditioner, to photograph user's gesture and perform equipment operation according to the gesture
- A device used for medical and health care, such as an endoscope, or a device for performing angiography by receiving infrared light
- A device used for security such as a surveillance camera, and a camera for person authentication
- A device used for beauty care such as a skin measuring instrument for photographing skin, and a microscope for photographing the scalp
- A device used for sport such as an action camera or a wearable camera for sports applications or the like
- A device used for agriculture such as a camera for monitoring the condition of fields and crops 3. Third Embodiment (Example of Electronic Device)

<Configuration Example of Electronic Device>

Moreover, the present technology is not limited to application to a solid-state imaging device, but can also be applied to an imaging device. Here, the imaging device refers to a camera system such as a digital still camera or a digital video camera, or an electronic device having an imaging function such as a mobile phone. Note that the imaging device may be a modular form mounted on an electronic device, that is, a camera module.

Here, a configuration example of an electronic device according to a third embodiment of the present technology will be described with reference to FIG. 10.

Figure 10:
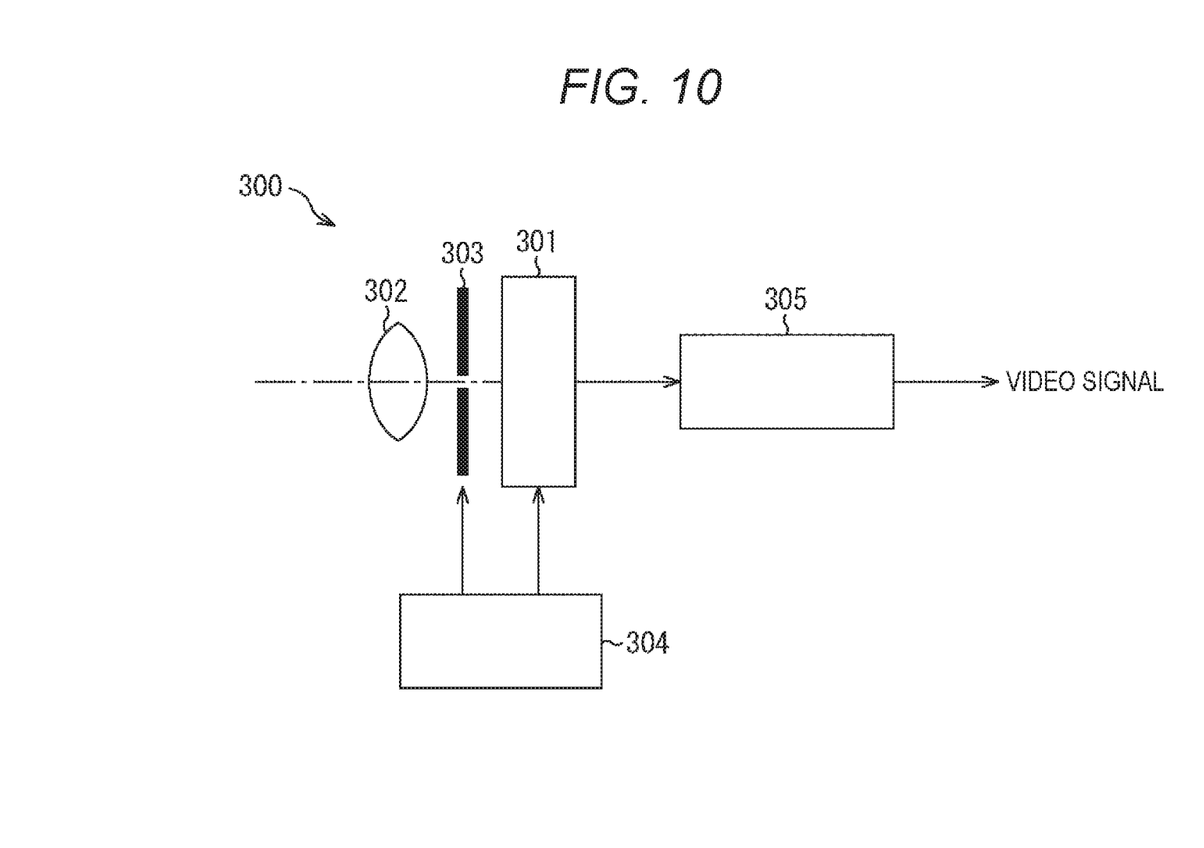
FIG. 10 is a block diagram illustrating a configuration example of an electronic device to which the present technology is applied.

An electronic device 300 illustrated in FIG. 10 includes a solid-state imaging device (element chip) 301, an optical lens 302, a shutter device 303, a drive circuit 304, and a signal processing circuit 305. As the solid-state imaging device 301, the solid-state imaging device 10 according to the first embodiment of the present technology described above is provided. With this configuration, the reliability of the solid-state imaging device 301 of the electronic device 300 can be improved.

The optical lens 302 images an image light (incident light) from a subject on an imaging surface of the solid-state imaging device 301. As a result, the signal charge is accumulated in the solid-state imaging device 301 for a certain period. The shutter device 303 controls a light irradiation period and a light shielding period for the solid-state imaging device 301.

The drive circuit 304 supplies a drive signal for controlling signal transfer operation of the solid-state imaging device 301 and shutter operation of the shutter device 303. The solid-state imaging device 301 performs signal transfer according to the drive signal (timing signal) supplied from the drive circuit 304. The signal processing circuit 305 performs various signal processing on the signal output from the solid-state imaging device 301. The video signal subjected to the signal processing is stored in a storage medium such as a memory or output to a monitor.

Note that the embodiment of the present disclosure is not limited to the above-described embodiment, and various modifications are possible within the scope not deviating from the gist of the present disclosure.

Furthermore, in the above, the configuration described as one device (or processing unit) may be divided and configured as a plurality of devices (or processing units). On the contrary, configurations described as a plurality of devices (or processing units) in the above may be collectively configured as one device (or processing unit). Furthermore, other configurations other than those described above, of course, may be added to the configuration of each device (or each processing unit). Moreover, when the configuration and operation of the system as a whole are substantially the same, a part of the configuration of a certain device (or processing unit) may be included in the configuration of another device (or another processing unit). That is, the present technology is not limited to the above-mentioned embodiment, and various modifications are possible within the scope not deviating from the gist of the present technology.

While preferred embodiment of the present disclosure has been described in detail with reference to the accompanying drawings, the disclosure is not limited to such examples. It is obvious that various variations and modifications can be conceived within the scope of the technical idea described in the claims by a person having ordinary knowledge in the field of technology to which the present disclosure belongs, and, of course, it is understood that these variations and modifications belong to the technical scope of present disclosure.

REFERENCE SIGNS LIST

10 Solid-state imaging device
11 Unit pixel
12 Pixel array unit
13 Row scanning unit
14 Column processing unit
15 Reference signal generation unit
16 Column scanning unit
18 Timing control unit
23 AD conversion circuit
31 Comparison apparatus
32 Up/down counter
70 Initial voltage set circuit
101 Clip circuit
102 Constant current source
111 Amplifier Tr
112 Selection Tr
121 Tr
122 Tr
300 Electronic device
301 Solid-state imaging device
302 Optical lens
303 Shutter device
304 Drive circuit
305 Signal processing circuit

The invention claimed is:

1. A solid-state imaging device, comprising:
   a pixel array unit comprising an arrangement of unit pixels, wherein each of the unit pixels has a photoelectric conversion unit;
   a drive unit configured to drive a reading process of:
      a signal charge of the unit pixels as a first signal, wherein the first signal corresponds to a signal level, and
      a second signal that corresponds to a reset level, wherein the second signal is read after the first signal; and
   a clip circuit configured to:
      clip the signal level to a determined level in an initial voltage setting process, wherein the determined level is higher level than a signal voltage; and
      release the signal level clipped to the determined level in the reading process of the first signal.

2. The solid-state imaging device according to claim 1, further comprising a counter configured to:
   count in each period from a start to an end of each reading operation of the first signal and the second signal; and
   set count to 0 in the reading process of the second signal.

3. The solid-state imaging device according to claim 2, wherein the counter is further configured to count a D-phase in the reading process of the first signal and count a P-phase in the reading process of the second signal.

4. A signal processing method, comprising:
   in a solid-state imaging device including a pixel array unit, the pixel array unit comprising an arrangement of unit pixels each having a photoelectric conversion unit, and a drive unit configured to drive a reading process of a signal charge of the unit pixels as a first signal and a reading process of a second signal, wherein the first signal corresponds to a signal level, the second signal corresponds to a reset level, and the second signal is read after the first signal:
   clipping the signal level to a determined level in an initial voltage setting process, wherein the determined level is higher level than a signal voltage; and
   releasing the signal level clipped to the determined level in the reading process of the first signal.

5. An electronic device, comprising:
   a solid-state imaging device comprising:
      a pixel array unit, wherein the pixel array unit comprises an arrangement of unit pixels each having a photoelectric conversion unit;
      a drive unit configured to drive a reading process of:
         a signal charge of the unit pixels as a first signal, wherein the first signal corresponds to a signal level, and
         a second signal that corresponds to a reset level, wherein the second signal is read after the first signal; and a clip circuit configured to:
  clip the signal level to a determined level in an initial voltage setting process, wherein the determined level is higher level than a signal voltage; and
  release the signal level clipped to the determined level in the reading process of the first signal;
a signal processing circuit configured to process an output signal output from the solid-state imaging device; and
an optical system configured to cause an incident light to be incident on the solid-state imaging device.

* * * * *